Figure 1:
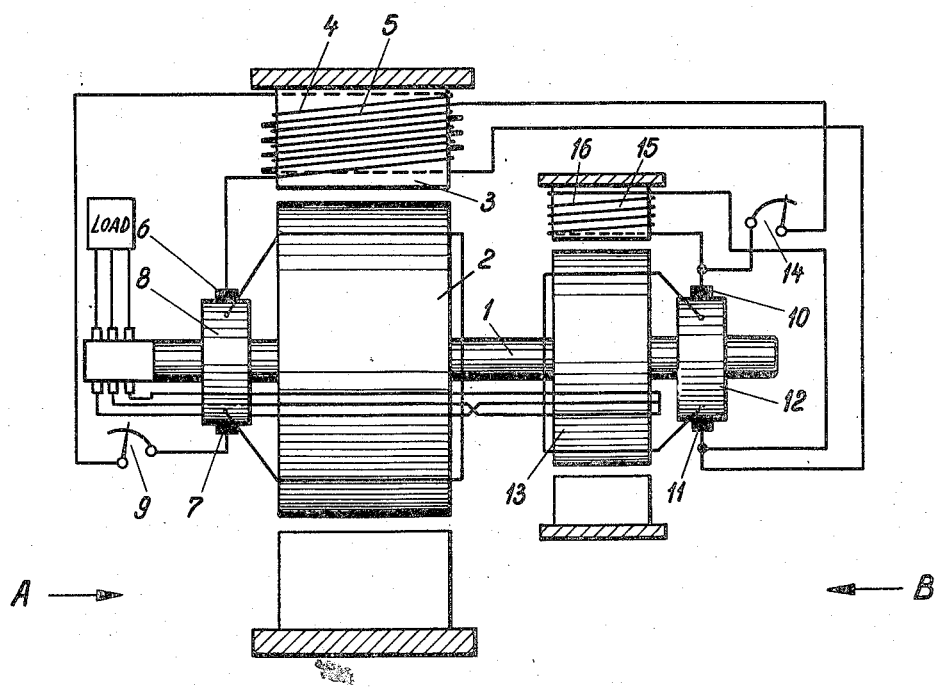

Sept. 16, 1958     L. HEIL     2,852,731
COMPOUND WOUND GENERATOR

Filed Dec. 13, 1954     2 Sheets-Sheet 1

INVENTOR:
LUDWIG HEIL
BY:

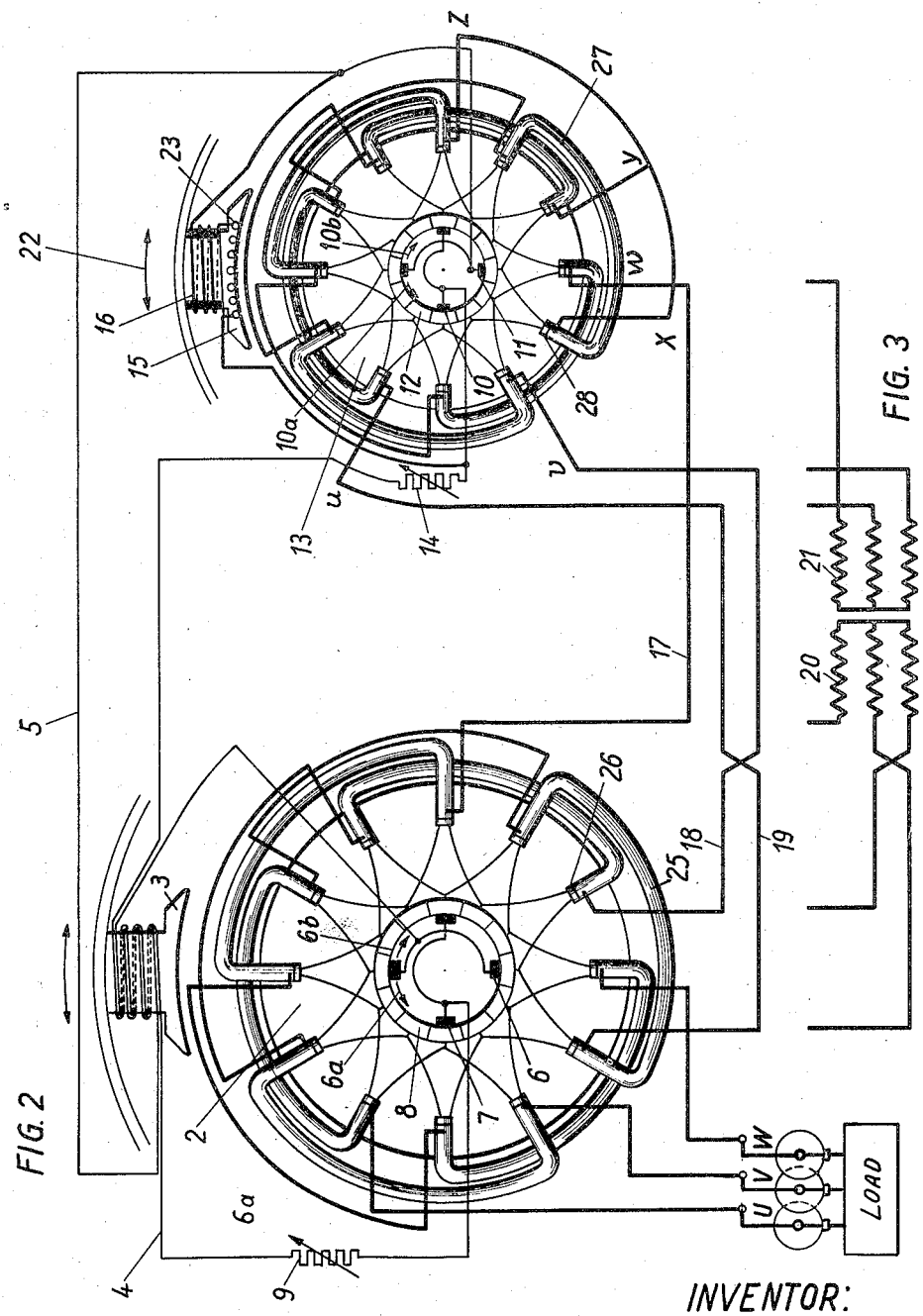

United States Patent Office 2,852,731
Patented Sept. 16, 1958

2,852,731

COMPOUND WOUND GENERATOR

Ludwig Heil, Neu-Isenburg, Germany, assignor to Firma A. Van Kaick "AvK"-Generatoren- und Motoren-Werk, Frankfurt am Main, Germany Application December 13, 1954, Serial No. 474,908

Claims priority, application Germany February 20, 1954

5 Claims. (Cl. 322—24)

The present invention relates to a compound wound alternating current generator and more particularly to a circuit for improving the voltage regulation thereof under conditions of no load and full load.

It has been found in practice to be impossible to operate known compound wound alternating current generators in parallel either with one another or with generators of other types. When such operation is attempted there occurs a resonant rise in amplification and undesirable oscillations are produced. Moreover, the voltage regulation curve of the generators, rather than being uniform, has an undesirable curvature which is very difficult and commercially unfeasible to eliminate.

It is an object of the present invention to provide a generator circuit arrangement which permits operation of compound-wound alternating-current generators in parallel with the main power supply lines or with another generator without the disadvantages encountered heretofore.

It is a further object of the present invention to provide a compound wound alternating-current generator the output voltage of which remains extremely stable and the power factor of which remains low while the reactive power of the generator may be adjusted and exactly controlled under various loading conditions.

In accordance with the invention the compound wound alternating-current generator is self-excited and is provided with a synchronously-driven rotating field transformer through which the load current flows. The generator has two entirely independent and separated types of excitation which are produced in independent, regulatable circuits. One of these circuits creates the primary excitation which is required during the idling of the generator and which is fed through independent brushes of the primary exciter circuit itself, whereas another circuit which will be termed hereafter, "supplemental excitation circuit," supplies a supplemental excitation which is fed through independent brushes of the supplemental excitation circuit to the supplemental pole windings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which Fig. 1 is a schematic diagram of the circuit of a main generator and of a supplemental generator according to the present invention;

Fig. 2 is a diagram showing on the left side a view of the main generator taken in the direction of arrow A in Fig. 1, and showing on the right side a view of the supplemental exciting generator taken in the direction of the arrow B in Fig. 1; and Fig. 3 is a diagram of a transformer arranged in the circuit of the generator load current.

Referring now to the drawing, there is shown a common shaft 1 on which the armature 2 of the external pole generator is mounted. External pole 3 has wound thereupon two separate exciter windings 4 and 5. Although only a single pole is shown in the drawing as carrying separate windings it is to be understood that each of the poles carry windings. Primary winding 4 is connected by means of brushes 6 and 7 which preferably are peripherally adjustable as indicated by arrows 6a and 6b, that is, adjustable about the outer circumferential surface of commutator 8. Commutator 8 is mounted on the common shaft 1 of the generator and is connected with a self-exciting direct current winding 26 as shown in Fig. 2. For purposes of controlling the amount of primary exciter current, there is provided in the primary exciter circuit an adjustable regulator 9. The regulator may be an adjustable resistor and adjustment of the value thereof which regulates current through primary winding 4 controls the output voltage of the generator. The alternating current winding 25 of armature 2 is connected to the terminals $u$, $v$ and $w$ and by way of conductors 17, 18 and 19 to the alternating-current winding 27 of the armature 13 of the supplemental exciter circuit. The alternating-current winding 25 and the direct-current winding 26 of the armature 2 can be arranged in the same winding groove on the armature. The load circuit is adapted to be connected to the terminals $u$, $v$, $w$.

The supplemental exciter circuit includes supplemental exciter winding 5 which is connected to commutator 12 by means of brushes 10 and 11. The exciter winding 5 may be connected in series or parallel to the brushes. It may also be fed by an external source of potential. As in the case of the primary excitation circuit, brushes 10 and 11 preferably are adjustable about the periphery of the commutator ring as indicated by arrows 10a and 10b. Commutator 12 is also mounted on common shaft 1 and is connected in circuit with a direct-current winding 28 of the exciter armature 13. The direct-current winding 28 is mounted in the same winding groove as the alternating-current winding 27 of the exciter armature 13. The alternating-current winding 27 is supplied with the generator load current from the alternating-current winding 25 of the generator armature 2. The supplemental excitation current may be regulated by means of regulator 14 which is in series with the supplemental winding. Pole 15 and winding 16 serve to produce the excitation for armature 13.

The supplemental excitation circuit provides rotating field excitation which supplements the direct current excitation. The armature 13 of the supplemental exciting machine is provided for that purpose with the alternating-current winding 27, $x$, $y$, $z$ through which the generator load current flows by way of the conductors 17, 18 and 19 directly, or indirectly through a transformer 20, 21 (Fig. 3). The winding through which the generator load current flows is connected through phase transposition so that the counter-rotating rotary field remains stationary in space as a result of the synchronous drive of the generator.

That is, the generator is of the type which has external salient poles the windings of which are separated from one another. The armature of the generator is provided with a direct current winding connected to the excitation coil through its own commutator for producing the primary excitation voltage.

The supplemental excitation circuit according to the invention also has external salient poles which are structurally separated from one another and which preferably are connected magnetically together through a peripherally adjustable yoke. By turning the yoke in the direction of arrows 22, the phase angle of the generator can be changed in such manner that the supplemental excitation is matched in phase to that of the generator.

In order to control the phase angle and the reactive portion of the output of the generator, the regulators 9, 14 which are in circuit with the exciter circuits may be employed. Adjustment of the regulators not only prevents undesirable oscillation which would normally occur because of the resonant build-up due to the reactive current component, but also makes it possible to operate the generator at a constant power factor. When the resistance of the regulator is increased, the reactive component of the generator is reduced and at the same time limited to a predetermined value. Because of the compound operation of the generator, the reactive component of the generator current remains proportional to the generator current and therefore the power factor remains substantially constant. At the same time as the supplemental excitation is reduced, the primary excitation must be increased.

The compound alternating current generator operates in the following manner: At no load, the primary generator is energized by the primary energizing winding 4 alone. This in turn is energized by means of the commutator 8 which is connected to the self-exciting direct-current winding 26 of the armature 2. If a load current flows through the alternating-current winding 25 of the armature, an additional excitation is produced in the primary generator due to the auxiliary exciting winding 5 wound about the pole 3 thereof. Accordingly, the voltage supplied at the terminals $u$, $v$, $w$ by the generator remains constant. This automatically follows since the load current also flows through the alternating current winding 27 of the armature 13 of the supplemental exciter. Since this is connected in phase opposition with respect to the alternating current winding 25 of the armature 2, a stationary field is produced in the air gap of the supplemental exciter having the armature 13.

This stationary field strongly influences the magnitude of the produced direct-current voltage and thus the supplemental exciting current in the direct-current winding 28 of the armature 13. By regulating the main exciting circuit by means of the resistor 9 and by regulating the supplemental exciting circuit by means of the resistor 14 it is possible to produce a desirable positioning of the required supplemental excitation. Further refinements and adjustments for different operating proportions can be provided by adjusting the peripheral positions of the brushes on the commutators 8 and 12 and also by rotating the magnetic yoke of the supplemental exciter.

For parallel operation of generators, it is desirable that the reactance of the generators be small, and so it is preferable that extremely small slot flux and overhang leakage flux be present. Also it is desirable to have as high a magnetic saturation of the magnetic circuit with as small a number of generator windings as possible. It is known from experience that compound wound alternating-current generators having high reactance have too much reactive component under sudden loads and are therefore operated at their limit of stability at about 60% reactive current component, or a power factor of about 0.8 in the capacitive sense. Compound wound alternating-current generators in accordance with the present invention have very low reactive components and it is possible to operate them in parallel with other alternating current generators without any danger of oscillations. This is due to the prevention of the capacitive loading of the generators.

In addition to the advantage above, it is possible in accordance with the present invention to stabilize the output voltage of the generator to a marked degree. This is because the salient poles of the supplemental exciter circuit have very low saturation, preferably about ⅕ to ⅔ that of the primary generator poles. Because of this, there is not required for the supplemental exciter circuit the strict rectilinear dependence of the supplemental exciter voltage upon the generator load current. Also, a uniform potential regulation curve of the generators is produced and advantageous commutation of the supplemental generator circuit is provided.

In using the generator as a single phase alternating current generator, it is advantageous to protect the cores of the primary poles with a magnetically short circuiting ring in order to suppress the harmful oppositely directed armature rotating field. Using a single phase generator and the supplemental exciter circuit already described, it is possible practically entirely to suppress the oppositely directed rotating field if the salient poles are also provided with damper cages, in a manner known per se in the art. For example, the pole shoe of the pole 15 shown in Fig. 2 is provided with the rods 23 of such a field damping cage. The illustrated damping means are also advantageous for three phase generators if the phases are unequally loaded.

Summarizing, the present invention allows for operation in which resonant build-up of current is prevented. It permits oscillation-free operation of a plurality of alternating current generators in parallel. The generator of the present invention is extremely reliable insofar as constant voltage output is concerned and is very easy to adjust and to readjust. The power factor of the generator is considerably reduced and satisfactory commutation is obtained in a very simple and economical way.

It will be understood that each of the elements described above, or two or more together, may also find a useful application in other types of alternating current generators differing from the types described above.

While the invention has been illustrated and described as embodied in an alternating current generator having salient poles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound alternating current generator comprising, in combination, a base member; a main armature rotatably mounted on said base member; a main direct current winding mounted on said armature; a plurality of external poles mounted on said base member and disposed about said armature for exciting the same; a main commutator rotatably mounted on said base member and adapted to be rotated in synchronism with said armature; a plurality of main exciting windings, each of said main exciting windings being wound respectively about one of said external poles and being connected in circuit with said main commutator and direct current winding to form a main excitation circuit; a main alternating current winding mounted on said main armature and adapted to have generator load current generated therein by said primary excitation circuit; a supplemental armature rotatably mounted on said base member and adapted to be rotated in synchronism with said main armature; a supplemental alternating current winding mounted on said supplemental armature and connected in phase opposition with said main alternating current winding so that said generator load current flows through said supplemental alternating current winding; a plurality of supplemental exciting windings, each of said supplemental windings being mounted respectively on one of said external poles; a supplemental direct current winding mounted on said supplemental armature; a supplemental commutator rotatably mounted on said base member and adapted to be synchronously rotated with said armatures, said commutator being connected in circuit with said supplemental exciting and direct current windings to form a supplemental exciting circuit; and regulating means connected in circuit with said primary and supplemental exciting circuit for regulating the current flowing through said main and said supplemental exciting windings.

2. A compound alternating current generator arrangement for providing a substantially constant regulated generator current output comprising, in combination, a main generator including a main rotatable armature, a main alternating and direct current winding mounted on said armature, a plurality of external poles disposed about said armature, a main and a supplemental exciting winding wound about each of said poles, and a main rotatable commutator connected in circuit with said main direct current and exciting windings to form a primary excitation circuit for said main generator and to produce generator load current in said main alternating current winding; and a supplemental generator including a supplemental rotatable armature adapted to be rotated in synchronism with said main rotatable armature, a supplemental alternating current winding mounted on said supplemental rotatable armature and connected in circuit with said main alternating current winding and being in phase shifted relationship with respect to said main alternating current winding, a supplemental direct current winding mounted on said supplemental armature, and a supplemental rotatable commutator connected in circuit with said supplemental direct current winding and said supplemental exciting winding wound about said poles of said main generator to form a supplemental exciting circuit.

3. A compound alternating current generator arrangement for providing a substantially constant regulated generator current output comprising, in combination, a main generator including a main rotatable armature, a main alternating and direct current winding mounted on said armature, a plurality of external poles disposed about said armature, a main and a supplemental exciting winding wound about each of said poles, and a main rotatable commutator connected in circuit with said main direct current and exciting windings to form a primary excitation circuit for said main generator and to produce generator load current in said main alternating current winding; a supplemental generator including a supplemental rotatable armature adapted to be rotated in synchronism with said main rotatable armature, a supplemental alternating current winding mounted on said supplemental rotatable armature and connected in circuit with said main alternating current winding and being in phase shifted relationship with respect to said main alternating current winding, a supplemental direct current winding mounted on said supplemental armature, and a supplemental rotatable commutator connected in circuit with said supplemental direct current winding and said supplemental exciting winding wound about said poles of said main generator to form a supplemental exciting circuit; and variable resistor means for regulating any current flowing through said primary and supplemental excitation circuits.

4. A compound alternating current generator arrangement for providing a substantially constant regulated generator current output comprising, in combination, a base member; a shaft rotatably mounted on said base member; a main generator mounted on said base member and including a main rotatable armature fixedly mounted on said shaft, a main alternating and direct current winding mounted on said armature, a plurality of external poles disposed about said armature, a main and a supplemental exciting winding wound about each of said poles, and a main rotatable commutator fixedly mounted on said shaft connected in circuit with said main direct current and exciting windings to form a primary excitation circuit for said main generator and to produce generator load current in said main alternating current winding; and a supplemental generator mounted on said base member and including a supplemental rotatable armature fixedly mounted on said shaft and spaced from said main rotatable armature, a supplemental alternating current winding mounted on said supplemental rotatable armature and connected in circuit with said main alternating current winding and being in phase shifted relationship with respect to said main alternating current winding, a supplemental direct current winding mounted on said supplemental armature, and a supplemental rotatable commutator fixedly mounted on said shaft and connected in circuit with said supplemental direct current winding and said supplemental exciting winding wound about said poles of said main generator to form a supplemental exciting circuit.

5. A compound alternating current generator arrangement for providing a substantially constant regulated generator current output comprising, in combination, a main generator including a main rotatable armature, a main alternating and direct current winding mounted on said armature, a plurality of external poles disposed about said armature, a main and a supplemental exciting winding wound about each of said poles, a main rotatable commutator, and a plurality of main brush means making electrical sliding contact with said main commutator and shiftable with respect thereto, said main brushes being connected in circuit with said main direct current and exciting windings to form a primary excitation circuit for said main generator and to produce generator load current in said main alternating current winding; and a supplemental generator including a supplemental rotatable armature adapted to be rotated in synchronism with said main rotatable armature, a supplemental alternating current winding mounted on said supplemental rotatable armature and connected in circuit with said main alternating current winding and being in phase shifted relationship with respect to said main alternating current winding, a supplemental direct current winding mounted on said supplemental armature, a supplemental rotatable commutator, and a plurality of supplemental brush means making electrical sliding contact with said supplemental commutator and shiftable with respect thereto, said supplemental brushes being connected in circuit with said supplemental direct current winding and said supplemental exciting winding wound about said poles of said main generator to form a supplemental exciting circuit.

References Cited in the file of this patent
UNITED STATES PATENTS

| | | |
|---|---|---|
| 2,480,844 | Fox | Sept. 6, 1949 |
| 2,689,921 | Tardel | Sept. 21, 1954 |